United States Patent [19]

Cherenko et al.

[11] 4,039,720
[45] Aug. 2, 1977

[54] LAMINATED WINDSHIELD WITH IMPROVED INNERLAYER

[75] Inventors: Joseph Cherenko, Valencia; Charles W. Lewis, Pittsburgh, both of Pa.

[73] Assignee: PPG Industries, Inc., Pittsburgh, Pa.

[21] Appl. No.: 682,538

[22] Filed: May 3, 1976

[51] Int. Cl.² ............... B32B 27/40; C08G 18/06; B29C 19/02; B05D 3/06

[52] U.S. Cl. ................ 428/425; 156/272; 204/159.19; 204/159.21; 260/75 TN; 427/54; 428/424; 428/426; 428/430; 428/437; 428/411; 428/409; 264/22

[58] Field of Search ......... 204/159.19, 159.21; 428/424, 426, 430, 409, 425, 411; 156/272; 427/54; 264/22; 260/75 TN

[56] References Cited

U.S. PATENT DOCUMENTS

| | | | |
|---|---|---|---|
| 3,499,783 | 3/1970 | Nelson | 428/425 |
| 3,509,015 | 4/1970 | Wismer | 428/425 |
| 3,518,175 | 6/1970 | Bell | 204/159.19 |
| 3,554,962 | 1/1971 | Fischer | 260/45.7 PH |
| 3,700,643 | 10/1972 | Smith | 204/159.19 |
| 3,711,364 | 1/1973 | Ahramjian | 428/424 |
| 3,764,457 | 10/1973 | Chang | 428/412 |
| 3,839,171 | 10/1974 | Akamatsu | 204/159.19 |
| 3,912,516 | 10/1975 | Recchia | 204/159.19 |
| 3,915,824 | 10/1975 | McGinniss | 204/159.19 |
| 3,931,113 | 1/1976 | Seeger | 260/75 NT |

*Primary Examiner*—Ellis Robinson
*Attorney, Agent, or Firm*—Donna L. Seidel

[57] ABSTRACT

Safety glass is made by laminating to a ply of glass a polyurethane film incorporating a photoinitiator. The exposed surface of the film is irradiated with ultraviolet light which activates the photoinitiator which in turn initiates crosslinking of the polymer. The polymer film retains its desirable mechanical and optical properties while the crosslinked surface has improved solvent-abrasion resistant.

23 Claims, No Drawings

LAMINATED WINDSHIELD WITH IMPROVED INNERLAYER

BACKGROUND OF THE INVENTION

1. Field of the Invention

The present invention relates broadly to the art of making safety glass and more particularly to the art of making safety glass windshields combining improvements in safety performance and optical quality durability.

2. Description of the Prior Art

Safety glass is a well known term describing a glass-plastic laminate designed to reduce the severity of lacerative injuries resulting from impact sufficient to break the glass. A plastic film is laminated to a glass sheet so that upon impact sufficient to break the glass, the film adheres to the glass fragments, thus minimizing their dispersion. To be useful as safety glass, a laminate must have the following properties over a wide range of temperature and moisture conditions: (1) high energy absorption to minimize concussive injuries on impact, (2) high shear and tear strength to prevent rupture of the film by glass fragments, (3) sufficient adhesion between the layers to minimize dispersion of glass fragments thereby reducing the potential for lacerative injury, and (4) good optical quality Safety glass commercially employed is commonly a multiple laminate of two plies of glass with an interlayer of polyvinyl butyral plastic film. Alternative safety glass laminates, particularly for use as automobile windshields, are proposed either in the form of a single ply of glass with a plastic innerlayer or in the form of standard commercial safety glass with a plastic innerlayer on the inboard ply of glass. Upon impact sufficient to break these alternative forms of windshields, the probability of encountering glass fragments inside the passenger compartment is reduced. However, since the innerlayer will be exposed, the demands on the plastic film are much greater. It must not meet the requirements of energy absorption, tear strength, adherence and optical quality and previously discussed, but its surface must also have good weathering properties, chemical stability and abrasion resistance to provide durability for its required optical quality.

Thermoset polymer films typically have such durability; however, such films are difficult to laminate. In addition, rigid films contribute to concussive injury. Thermoplastic polymer films are relatively easy to laminate and are sufficiently ductile to absorb energy on impact, but they are often moisture and solvent sensitive and their surfaces are easily scratched, resulting in a loss of optical transparency.

It is known in the polymer art that some thermoplastic polymers, if crosslinked, become less elastomeric, less soluble, and in many respects similar to thermoset polymers. Thermoplastic polymers may be crosslinked during the polymerization reaction. However, crosslinked polymers are difficult to process. Alternatively, the polymer formulation may be treated with a crosslinking agent which can be activated subsequent to forming the polymer into the desired shape. Photochemical activation of a photosensitive crosslinking agent is an example.

The photochemical properties of benzophenone are well-known. For example, when exposed to ultraviolet radiation, such as sunlight, benzophenone in solution in an organic medium, such as isopropanol, produces tetraphenylethylene glycol. The reaction mechanism consists of the following sequence of steps:

1. $\phi_2 CO$ + photon $\rightarrow \phi_2 CO^*$ (excited benzophenone molecule)
2. $\phi_2 CO^*$ + $(CH_3)_2 CHOH$ $\rightarrow \phi_2 COH\cdot$ + $(CH_3)_2 COH\cdot$ (generation of free radicals)
3. $2 \phi_2 COH\cdot \rightarrow \phi_2 (COH)_2 \phi_2$ (tetraphenylethylene glycol)

Excited benzophenone molecules are equally capable of abstracting hydrogen from hydrocarbons. The well-known oxidative dimerization of aliphatic hydrocarbons by photochemical reaction with benzophenone proceeds as follows:

(4). $\phi_2 CO$ + photon $\rightarrow \phi_2 CO^*$
(5). $\phi_2 CO^*$ + $RCH(CH_3)_2 \rightarrow \phi_2 COH\cdot$ + $RC(CH_3)_2\cdot$
(6). $2RC(CH_3)_2\cdot \rightarrow RC(CH_3)_2 C(CH_3)_2 R$ The extension of this reaction for alkyl dimerization into the field of alkyl polymer crosslinking is shown in the discussion of the following references.

A method for decreasing the thermoplasticity and solubility of polymers of ethylene usable as safety glass interlayers is taught by Roedel in U.S. Pat. No. 2,484,529. The method involves blending such polymers with ketones such as acetone, benzophenone or benzoin, and then exposing the blend to ultraviolet light.

An improved method for making polyethylene articles is taught by Tocker in U.S. Pat. No. 3,214,492. The method involves copolymerizing ethylene with acryloxy- or methacryloxy- substituted benzophenones or acetophenones, shaping the copolymer into a useful article, and exposing the article to ultraviolet radiation to produce crosslinking.

Potts et al., in U.S. Pat. No. 3,219,566, teach that anthrone is superior to benzophenone for crosslinking polyethylene and polypropylene in the presence of ultraviolet light.

Bell teaches a method for making crosslinkable polyesters in U.S. Pat. No. 3,518,175. The method involves copolymerizing the polyester with a substituted benzophenone. Exposure of the resulting photosensitized terpolymer to ultraviolet radiation produces crosslinking.

It is not shown or suggested in the copolymer art that polyurethanes or other polymers are likewise crosslinkable by exposure to ultraviolet light in the presence of benzophenone to produce a transparent layer that is crosslinked in at least a surface portion to improve its solvent-abrasion resistance without degrading its desired mechanical, adhesive and optical properties so that the polymer may be employed as an exposed innerlayer in a safety glass laminate.

SUMMARY OF THE INVENTION

The present invention provides an improved safety glass by combining the desirable properties of both thermosplastic and thermoset polymers in an innerlayer of thermoplastic polymer with its exposed surface crosslinked. The present invention further provides a method for making safety glass by laminating a polymer layer to glass while the polymer is essentially thermoplastic, then crosslinking the exposed surface of the polymer to impart characteristics to the surface that improve the durability of its optical quality.

The present invention concerns polymer films which can be laminated to a glass play and subsequently crosslinked to produce more durable bilayer safety glass. For the purpose of discussing the present invention, glass ply is defined as a rigid transparent substrate which may include, in addition to glass, generally recognized glass substitutes such as acrylics, polycarbonates and other rigid, transparent plastics. The polymer films useful for carrying out the present invention include polyurethanes, particularly polyesterurethanes such as polybutylene adipate, polycaprolactone and polycarbonate-based polyurethanes, and polyvinylacetals, particularly polyvinyl butyral.

A crosslinkable polymer film is prepared by incorporating a small amount of photoinitiator, such as benzophenone or xanthone, into the polymer film. The photoinitiator may be physically blended with the polymer before film formation or subsequently incorporated into the film, such as by soaking the film in a solution of the photoinitiator in an appropriate solvent or spraying the film with such a solution of the photoinitiator. Photoinitiators, for the purpose of carrying out the present invention, are chemical compound which generate free radicals upon exposure to actinic radiation and initiate crosslinking of the polymer.

A thin film of crosslinkable polymer may be cast or extruded and laminated by conventional techniques to a glass ply. Alternatively, a film may be cast in place on the glass ply. The laminate is then exposed to ultraviolet radiation which activates the photoinitiator, which, in turn, initiates the crosslinking of the polymer, primarily at the exposed surface.

The desirable mechanical and optical properties of the film are retained while the solvent-abrasion resistance of the surface of the film is so improved by crosslinking that a safety glass laminate may be produced and used with the crosslinked polymer surface exposed.

DETAILED DESCRIPTION OF THE PREFERRED EMBODIMENTS

The polymers most useful in the practice of the present invention are polyurethanes prepared by the reaction of an organic diisocyanate and a polyester polyol having a molecular weight above about 1000. The preferred organic diisocyanates are aliphatic diisocyanates, such as 1,6 hexamethylene diiocyanate, and particularly cycloaliphatic diisocyanates, such as 4,4' methylene-bis-(cyclohexyl isocyanate). Polyester polyols useful for the preparation of the above polyurethanes include condensation products of organic polycarboxylic acids and organic polyols such as described in U.S. Pat. No. 3,214,411 to Saunders et al. Preferred polyester polyols include polybutylene adipate diols, polycaprolactone diols, and polycarbonate diols.

The reaction of the organic diisocyanate and the polyester polyol is preferably carried out with a chain extender, i.e., a compound having at least two active hydrogens and a molecular weight below 250, such as 1,4 butanediol. The reaction is conducted by techniques well-known in the art such as bulk polymerization or the prepolymer method. Preferred polyurethanes are described in U.S. Pat. No. 3,764,457 to Chang et al. and U.S. Pat. No. 3,931,113 to Seeger et al.

The polyurethanes thus prepared may be blended with a photoinitiator and cast as a thin transparent film. Alternatively, the polyurethanes may be cast or extruded as a thin transparent film and then soaked in or sprayed with a solution of a photoinitiator. Preferred photoinitiators include benzophenone, xanthone, acetophenone, anthraquinone, 2-methyl anthraquinone, 2[2'hydroxy 5'-methylphenyl] benzotriazole, anthrone and butanedione. Benzophenone and xanthone are most preferred. Less preferred are photoinitiators which have a tendency to discolor the polyurethane with age, notably anthrone. The preferred range of photoinitiator concentration is from about 0.3 to about 5 percent based on the weight of the polymer. The optimum concentration depends on the choice of photoinitiator and the duration of exposure to ultraviolet light.

The crosslinkable polymer film is laminated, preferably by pressing the film between two glass plies, one of which is coated with a release agent such as polysiloxane or polytetrafluoroethylene (TEFLON), and heating to promote adhesion of the film to the uncoated glass ply. A detailed description of a preferred laminating technique is found in U.S. Pat. No. 3,808,077 to Rieser et al, which description is incorporated herein by reference. Alternatively, the polyurethane may be cast in place by a technique such as that described in U.S. Pat. No. 3,509,015 to Wismer et al. In this method, film forming and laminating are accomplished in one operation.

Following lamination, the free surface of the film is exposed to actinic radiation, preferably ultraviolet radiation in the wavelength range of 200 to 400 nanometers, until sufficient crosslinking has occurred to render the surface substantially more solvent-abrasion resistant than an untreated surface.

The laminates thus produced are particularly useful as windshields, sidelights and backlights, in automobiles and other vehicles. For optimum safety performance, the preferred laminate comprises 3/32 to 3/16 inch (2.3 to 4.5 millimeter) thick glass ply and a 15 to 40 mil (0.4 to 1.0 millimeter) thick polymer film.

The present invention will be further understood from the description of specific examples which follow. The substrates used in all of the examples are ⅛ inch (3 millimeter) thick soda-lime-silica float glass. The films are laminated to the substrates by assembling the film between two plies of glass, one of which is coated with a release agent, placing the assembly in a plastic bag, evacuating and sealing the bag, and placing the bagged assembly in an oil autoclave at a temperature of about 300°F. (about 149°C.) and pressure of about 200 pounds per square inch (about $1.38 \times 10^6$ newtons per square meter) for about 45 minutes. The laminates are then irradiated by lamps which produce ultraviolet radiation predominantly in the range of from 300 to 380 nanometers.

Following ultraviolet treatment, the exposed polymer surfaces are abraded with 400 mesh synthetic alundum abrasive and acetone by 1000 passes of a one pound (454 gram) weighted felt pad. The solvent abrasion resistance of each surface is then determined by dividing a 1.5 inch (38.17 millimeter) square in the center of a 2 inch by 4 inch (about 50 millimeter by 100 millimeter) sample into nine areas and measuring the percent haze in the central portion of each area. The data reported herein are the averages of the nine individual area haze measurements for each sample. The percent haze is measured on a Gardner Automatic Pivotable Sphere Hazemeter with back-lighting and an illuminant "C" Filter. The solvent abrasion resistances of the samples described in Examples I through IX, as measured by the percent haze after acetone-abrasion, are compared in Table I. The samples were further tested to determine their safety performance characteristics and were found to be acceptable according to commercial standards for automotive safety glass and comparable to bilayer laminates of glass and uncrosslinked polymer. Impact performance data for Examples XI and XII are compared in Table II. The following examples are offered to illustrate the invention.

EXAMPLE I

A polyurethane composition is prepared by reacting 4,4'-methylene-bis-(cyclohexyl isocyanate), a hydroxy-terminated polybutylene adipate diol having a molecular weight of about 2000, and 1,4 butanediol in a mole ratio of about 3.71 : 1.00 : 2.71 for about 24 hours at about 290°F. (about 143°C.). The polyurethane is extruded by conventional technique as a 20 mil (0.5 millimeter) thick film. Four inch (100 millimeter) square portions of the polyurethane film are laminated to glass substrates. An untreated, unabraded laminate has 3.0 percent haze. A laminate is cut into 2 by 4 inch (about 50 by 100 millimeter) samples which are abraded with 400 mesh synthetic alundum abrasive and acetone by 1000 passes of a one pound (454 grams) weighted felt pad. The abraded samples have an average of 8.1 percent haze.

EXAMPLE II

A laminate as described in Example I is then cut into two 2 by 4 inch (50 by 100 millimeters) samples which are irradiated with ultraviolet radiation (UV), one for 15 minutes and the other for 60 minutes. The exposed film surfaces of the laminates are then abraded as in Example I. After such solvent-abrasion, the samples show 11.7 and 13.6 percent haze.

EXAMPLE III

A polyurethane film as described in Example I is soaked in methyl ethyl ketone (MEK) for 45 minutes at room temperature. The film is then dried and laminated to a glass substrate. Two by 2 by 4 inch (50 by 100 millimeter) samples of the laminate are then exposed to ultraviolet radiation and subjected to solvent-abrasion treatment as in Example II. The samples show 13.6 and 8.9 percent haze.

EXAMPLE IV

A polyurethane film as described in Example I is soaked for 45 minutes at room temperature in a solution of 5 percent benzophenone in MEK. The film is dried and laminated as in Example III, and exposed to ultraviolet radiation for 15 minutes. Following the solvent-abrasion treatment as in the previous examples, the sample shows only 3.5 percent haze.

EXAMPLE V

A sample is prepared as in Example IV except that the MEK soak solution contains 2.5 percent benzophenone and the laminate is exposed to ultraviolet radiation for 60 minutes. After solvent-abrasion as in the previous examples, the sample shows 4.8 percent haze.

EXAMPLE VI

A sample is prepared as in Example IV except that the MEK soak solution contains 0.6 percent xanthone in place of benzophenone. The abraded example has 4.0 percent haze.

EXAMPLE VII

A sample is prepared as in Example V except that the MEK solution contains 5 percent acetophenone in place of benzophenone. Following solvent-abrasion as in the previous examples, the sample shows 5.1 percent haze.

EXAMPLE VIII

Polyurethane prepared as in Example I is blended with 1.5 percent benzophenone and pressed into a transparent sheet. The sheet is laminated to a glass substrate and exposed to ultraviolet radiation for one hour. After solvent-abrasion as in Example I, the same has 3.3 percent haze.

EXAMPLE IX

Polyurethane is prepared by reacting 4,4'-methylene-bis-(cyclohexyl isocyanate), a hydroxy terminated polycaprolactone diol of molecular weight about 1,000, and 1,4 butanediol in a mole ratio of about 2.3 : 1.0 : 1.3. The polyurethane is then physically blended with 1.5 percent by weight benzophenone. A film is cast and laminated to a glass substrate. The sample is exposed to ultraviolet radiation for one hour. After solvent-abrasion as in Example I, the same has 4.7 percent haze.

EXAMPLE X

Polyurethane is prepared as in Example I and extruded as a 0.020 inch (about 0.5 millimeter) film. Portions of the film are sprayed with a solution of 5 percent by weight benzophenone in methyl ethyl ketone. The films are then dried for 15 minutes at 200°F. (about 93°C.). The films contain about 3.6 percent by weight benzophenone. Portions of the film are then laminated to 7/32 inch (about 5.6 millimeter) thick float glass plies. The laminates are exposed to ultraviolet radiation for at least 30 minutes. After solvent-abrasion as in Example I, the samples show only light, very light, little or no abrasion.

EXAMPLE XI

In order to show that the improvement in solvent abrasion resistance was not obtained at the expense of safety performance, untreated polyurethane films as described in Example I are laminated to 12 by 12 inch (about 300 by 300 millimeter) plies of glass. The resulting laminates are held rigid in a frame and impacted from the film side with a 5 pound (2.27 kilogram) freely falling steel ball. The velocity of the ball at impact is calculated from the height at which the ball is released. The height is increased until the velocity of the ball is sufficient to penetrate the laminate. The penetration velocities for the uncrosslinked laminates are 20.3 miles per hour at 0°F. (about −18°C.), 19.9 miles per hour at 70°F. (about 21°C.) and 15.7 miles per hour at 120°F. (about 49°C.).

EXAMPLE XIII

For comparison with the uncrosslinked samples of Example XI, polyurethane films as described in Example I are soaked for one hour in a 5 percent by weight solution of benzophenone in methyl ethyl ketone. The films are dried and laminated to 12 by 12 inch (about 300 by 300 millimeter) glass substrates and then exposed to ultraviolet radiation for 30 minutes. The resulting laminates are held rigid in a frame and impacted as in Example XI. The penetration velocities for the crosslinked laminates are 21.7 miles per hour at 0°F. (about −18°C.), 18.4 miles per hour at 70°F. (about 21°C.) and 15.1 miles per hour at 120°F. (about 49°C.).

TABLE I

Solvent-Abrasion Resistance of Polyurethane Innerlayer

| Example | Photoinitiator | Solution | UV Exposure (minutes) | Haze (%) |
|---|---|---|---|---|
| I | none | none | none | 3.0* |
|  | none | none | none | 8.1 |
| II | none | none | 15 | 11.7 |
|  | none | none | 60 | 13.6 |
| III | none | MEK | 15 | 13.6 |
|  | none | MEK | 60 | 8.9 |
| IV | 5% BP | MEK | 15 | 3.5 |
| V | 2.5%BP | MEK | 60 | 4.8 |
| VI | 0.6% X | MEK | 15 | 4.0 |
| VII | 5% AP | MEK | 60 | 5.1 |
| VIII | 1.5% BP | none | 60 | 3.3 |
| IX | 1.5% BP | none | 60 | 4.7 |

*Unabraded
MEK - methyl ethyl ketone
BP - benzophenone
X - xanthone
AP - acetophenone

TABLE II

Penetration Resistance of Polyurethane Innerlayer

| | | Penetration Velocity of Laminate (miles per hour) | | |
|---|---|---|---|---|
| Example | Innerlayer | 0° F. | 70° F. | 120° F. |
| X | Uncrosslinked | 20.3 | 19.9 | 15.7 |
| XI | Crosslinked | 21.7 | 18.4 | 15.1 |

Although the present invention has been described in detail with respect to bilayer laminates of glass and polyurethane, the scope of the invention is not limited thereto. It will be evident to persons skilled in the art that variations and modifications may be made without departing from the spirit of this invention. For example, commonly known glass substitutes such as polycarbonates and acrylics may be used in place of glass. The glass ply may be the inboard ply of a conventional tri-layer windshield. Thermoplastic polymers, such as polyvinyl acetals, specifically polyvinyl butyral, may be used as the crosslinkable polymer in place of polyurethanes. Known photoinitiators may be substituted for the preferred photoinitiators. Other appropriate solvents for the photoinitiators may be employed, or the film may be exposed to photoinitiator in vapor form. The polymer film may also incorporate additional components such as an adhesion control additives. These and other variations will become obvious in the light of the claimed subject matter that follows.

We claim:

1. A method for making a safety glass laminate comprising the steps of:
   a. preparing a transparent film of a thermoplastic urethane polymer, essentially free of ethylenic unsaturation, which comprises a photoinitiator in an amount effective to initiate cross-linking of said film;
   b. laminating said film to a transparent ply of a material selected from the group consisting of glass and rigid transparent plastics; and
   c. irradiating the exposed surface of the film with actinic radiation to effect crosslinking of the exposed surface thereby improving its resistance to abrasion in the presence of organic solvents.

2. The method according to claim 1, wherein said actinic radiation is ultraviolet radiation.

3. The method according to claim 1, wherein said thermoplastic polymer is a polyester urethane.

4. The method according to claim 1, wherein said photoinitiator is selected from the group consisting of benzophenone, xanthone, acetophenone, anthraquinone, 2[2'-hydroxy 5'-methylphenyl] benzotriazole, anthrone and butanedione.

5. The method according to claim 1, wherein said photoinitiator is benzophenone.

6. The method according to claim 1, wherein said photoinitiator is xanthone.

7. The method according to claim 1, wherein said transparent film comprising a photoinitiator is formed by forming a film free of said initiator and then exposing said formed film to a composition containing said photoinitiator for sufficient time to incorporate into the film an effective amount of photoinitiator to crosslink the exposed surface portion of said film upon exposure to actinic radiation by insufficient to substantially impair the optical properties of said film.

8. The method according to claim 1, wherein said transparent film comprising a photoinitiator is formed by incorporating a photoinitiator into the polymer formulation prior to forming the film.

9. A transparent polymer film for use as an innerlayer in a bilayer safety glass laminate which consisting essentially of a thermoplastic urethane polymer, essentially free of ethylenic unsaturation, and an effective amount of photoinitiator which upon actinic radiation is capable of initiating crosslinking of said film especially at an exposed surface thereof.

10. A film as described in claim 9, wherein the polymer is a polyester urethane.

11. A film as described in claim 9, wherein the photoinitiator is selected from the group consisting of benzophenone, xanthone, acetophenone, anthraquinone, 2[2'-hydroxy 5'-methylphenyl] benzotriazole, anthrone, and butanedione.

12. A film as described in claim 11, wherein said photoinitiator is benzophenone.

13. A film as described in claim 11, wherein said photoinitiator is xanthone.

14. A safety glass laminate comprising:
   a. a first ply of a material selected from the group consisting of glass and rigid transparent plastics; and
   b. a transparent second ply, bonded to said first ply, of a thermoplastic urethane polymer essentially free of ethylenic unsaturation and an effective amount of photoinitiator wherein the exposed surface of said thermoplastic polymer is crosslinked actinic radiation.

15. The laminate as described in claim 14, wherein said first ply is transparent glass.

16. The laminate as described in claim 15, wherein said second ply is a transparent polyester polyurethane.

17. The laminate as described in claim 16, wherein said polyurethane is the reaction product of an aliphatic diisocyanate and a polyester polyol.

18. The laminate as described in claim 17 wherein said polyester polyol is polycaprolactone diol.

19. The laminate as described in claim 17, wherein said polyester polyol is a polycarbonate diol.

20. The laminate as described in claim 19, wherein said polycarbonate diol is a polyalkylenecarbonate diol.

21. The laminate as described in claim 17, wherein said polyester polyol is poly(1,4 butylene adipate)diol.

22. The laminate as described in claim 17, wherein said aliphatic diisocyanate is a cycloaliphatic diisocyanate.

23. The laminate as described in claim 22, wherein said cycloaliphatic diisocyanate is 4,4' methylene-bis-(cyclohexyl isocyanate).

* * * * *

UNITED STATES PATENT AND TRADEMARK OFFICE
CERTIFICATE OF CORRECTION

PATENT NO. : 4,039,720

DATED : August 2, 1977

INVENTOR(S) : Joseph Cherenko and Charles W. Lewis

It is certified that error appears in the above-identified patent and that said Letters Patent are hereby corrected as shown below:

Col. 1, line 40, after "not", insert --only--;

Col. 3, line 2, "play" should be --ply--;

Col. 8, line 14, "by" should be --but--;

Col. 8, line 45, Claim 14, before "actinic" insert --by--;

Signed and Sealed this

Twentieth Day of December 1977

[SEAL]

Attest:

RUTH C. MASON
*Attesting Officer*

LUTRELLE F. PARKER
*Acting Commissioner of Patents and Trademarks*